Patented Aug. 7, 1923.

1,463,883

UNITED STATES PATENT OFFICE.

HENRY A. GARDNER, OF WASHINGTON, DISTRICT OF COLUMBIA.

REACTION PRODUCT OF TUNG OIL AND A DECHLORINATED OIL AND PROCESS OF MAKING SAME.

No Drawing.    Application filed June 14, 1920.    Serial No. 388,913.

*To all whom it may concern:*

Be it known that I, HENRY A. GARDNER, a citizen of the United States, residing at Washington, in the District of Columbia, have invented certain new and useful Improvements in Reaction Product of Tung Oil and a Dechlorinated Oil and Processes of Making Same, of which the following is a specification.

It is known that unsaturated products having some of the properties of drying oils may be prepared from mineral oils and distillates thereof by a process involving chlorination of the mineral oil and the subsequent elimination of a portion at least of the chlorin.

I have discovered that unsaturated products of this general type, hereinafter for convenience briefly designated as "dechlorinated oils," may be employed with special advantages in conjunction with tung oil or polymerized products thereof; and that such dechlorinated oils exert a marked effect upon the polymerization of tung oil when mixed or compounded therewith. The products prepared in accordance with this invention are applicable not only for use as paint vehicles, varnishes and the like, but also in the plastic and other arts.

It is a well known characteristic of tung oils that they set to a jelly-like mass, presumably by polymerization, when heated for 8–10 minutes to a critical temperature of 280° C. Additions of linseed or other drying oils in substantial proportions (say 20% or upward) act to retard or prevent this polymerization. I have discovered that the dechlorinated oils, although resembling linseed oils in certain other respects, and particularly in their film-forming qualities, exert the contrary effect upon tung oils, not only accelerating the polymerization or setting of the product, but causing this action to take place at decidedly lower temperatures, or even at normal temperatures, as below more fully set forth. Moreover the products thereby formed have distinctive characteristics which render them available for numerous uses in the arts.

Below are certain illustrative examples in accordance with my invention, it being clearly understood however that the invention is not limited to the particular materials, proportions or manipulations described by way of example.

The dechlorinated oil used in accordance with the present invention may be prepared in any suitable way, but preferably in substantially the manner described in application Serial Number 343,458, filed December 9, 1919, Gardner and Bielouss Patent No. 1,384,447: that is to say a mineral oil or distillate, which is preferably of the paraffin type, is chlorinated to a suitable extent for the particular purpose in view, the chlorin absorbed by the oil usually amounting to between 30 and 60% by weight of the original oil. The chlorinated product may thereafter be diluted, preferably by a lighter hydrocarbon such for example as so-called mineral spirit (boiling point 160°–220° C) and is heated, preferably under a reflux condenser, to about 170°–190° C, a suitable accelerating agent for the dechlorination being added, such for example as granulated zinc or mixtures thereof with copper. The heating is continued until the evolution of hydrochloric acid substantially ceases. For many purposes the liquid prepared as above may be employed without further modification or addition. For film-forming purposes, as in the paint and varnish arts, appropriate driers may be added, such driers having been found to accelerate somewhat the formation of a hard film. For this purpose solutions of lead-manganese lineolate in turpentine have been found particularly effective, the solution of the drier being usually introduced in the proportion of 5 to 10% or more to the oil. For certain purposes, especially in the plastic and analogous arts, it is desirable before compounding the dechlorinated oil to remove therefrom a part or all of the added solvent, which may readily be accomplished by distillation up to about 220° C in air, or preferably at a lower temperature under correspondingly reduced pressure.

In the specific examples Nos. I–V which follow the dechlorinated oil contained approximately 30% of mineral spirits, which partially distilled off at the gelatinizing temperature. No drier was added.

*Example I.*

70 parts of raw tung oil were mixed with 30 parts of dechlorinated oil prepared in the manner described above from a paraffin base distillate which had absorbed approximately 55% by weight of chlorin; and the mixture heated. Gelatinization occurred immediately upon reaching the temperature of 180° C., the product being a rubbery mass which did not exhibit the crumbling structure characteristic of polymerized tung oil.

Example II.

50 parts of raw tung oil were mixed with 50 parts of the dechlorinated oil. Gelatinization occurred immediately at 180° C. as in Example I; but although the product contained a lesser proportion of the tung oil it exhibited in greater degree the characteristic crumbling structure of the latter.

Example III.

30 parts of tung oil were mixed with 70 parts of dechlorinated oil. The reaction set in at about 190° C., yielding a solid gelatinous product of crumbling structure.

Example IV.

10 parts of tung oil were mixed with 90 parts of dechlorinated oil. Reaction set in at about 200° C. or slightly less, yielding a solid rubbery mass.

Example V.

5 parts of tung oil were added to 95 parts of dechlorinated oil and the mixture heated to about 200° C. The mixture thickened decidedly but did not set at this temperature into a solid mass.

It is now regarded as probable that these transformations involve not merely the polymerization of the tung oil at a temperature decidedly below its well established critical point, but the formation of an as yet unidentified reaction product or products with the unsaturated hydrocarbon. This is indicated not only by the relatively low temperature at which the reaction sets in as compared with tung oil alone, and by the exothermic character of this reaction, but also by the very low proportions of tung oil which suffice to effect solidification of the mixture. My invention is not however limited by any theory as to the character of the reactions which yield the described results.

In the foregoing cases the reaction sets in at approximately the temperature indicated and proceeds rapidly and progressively to the solid phase, accompanied by the distillation of the volatile portions of the hydrocarbon solvent when this is present. The invention is not limited however to the presence of such solvent or diluent, since somewhat similar products may be prepared either from dechlorinated oil from which the solvent has been preliminarily removed, or alternatively from dechlorinated products to which no solvent has been added in advance of the dechlorinating step. It is preferred however to prepare the product in presence of a volatile solvent or diluent as above described, since such diluent serves to regulate and control the temperature by absorbing the heat required for its vaporization. The presence of the diluent is especially advantageous when a product of rather spongy texture is desired. It will be understood that my invention is not limited to the use of any specific diluting liquid in this particular relation, since a wide variety of hydrocarbon or other liquids miscible with the chlorinated or with the dechlorinated product such for example as solvent naphtha, chlorinated benzol, etc., may be employed.

In connection with the foregoing examples it may be explained that the dechlorinated oil, unmixed with tung oil, does not undergo polymerization, at least in any brief period of time, when heated in bulk to any temperature up to 250° C. On the other hand, suitable mixtures of tung oil with dechlorinated oil undergo slow reaction even at room temperatures, with ultimate transformation, wholly or in part, to the solid phase.

This latter fact permits the present invention to be applied with great advantage to the production of drying films, as in the preparation of paints and varnishes. For example a mixture of 30–70 parts of dechlorinated oil with 70–30 parts of raw tung oil, to which 5–10% of an appropriate drier may be added if desired, dries rapidly to a clear brilliant film, which is quite free from the crinkled appearance characteristic of raw tung oil films.

Furthermore, the addition of even small proportions of tung oil permits a quick-drying film to be formed from a dechlorinated oil prepared from a chlorinated oil of relatively low chlorin content. For instance:

Example VI.

85 parts of dechlorinated oil prepared by absorbing 45 parts of chlorin in 100 parts of paraffin oil, and thereafter dechlorinating in presence of about 25 parts of mineral spirits, were mixed with 10 parts of raw tung oil, and 5 parts of drier consisting of lead-manganese lineolate in turpentine solution. The resulting varnish dried much more rapidly than a mixture of 90 parts of the same dechlorinated oil with 10 parts of the same liquid drier. It appears therefore that the addition of tung oil even in relatively small proportions renders possible the saving of material quantities of chlorin in the preparation of the dechlorinated oil. When it is desired to increase the drying rate larger proportions of tung oil may be used; or alternatively the mineral oil may be more fully chlorinated in the first instance. By proper combination of these factors a wide variety of special films may be produced.

As pointed out above, mixtures of raw tung oil with dechlorinated oil in various proportions possess the property of setting or solidifying in time even at ordinary temperatures. I have discovered however that this reaction may be greatly accelerated and even rendered substantially instantaneous by the addition to the mixture or to either component thereof of even very small proportions of catalytic agents or accelerators, among which sulfur chlorid is preferred. Additions of even a fraction of a percent of this compound will serve the purpose, especially when the dechlorinated oil has been preliminarily freed from volatile solvent. Thus:

*Example VII.*

60 parts of tung oil were mixed with 40 parts of dechlorinated oil, from which the volatile solvent had been removed by distillation under reduced pressure. To this mixture 0.5% of sulfur chlorid was added with stirring. Reaction ensued without application of external heat, yielding a solid, elastic, rubbery mass, suitable for use as a tire-filler, for the preparation of linoleum, and a wide variety of analogous purposes.

Raw tung oil and dechlorinated oil appear to be capable of reacting at normal or higher temperatures, with or without a catalytic agent or accelerator, in all proportions, the reaction products being solid over an extremely wide range of admixture of the component oils. Such reaction products, whether solid or liquid, are broadly claimed herein.

The term "tung oil" is used herein to include not only the oil derived from the nuts of the Chinese wood oil tree (tung nuts) but also other allied oils obtained from plants of the Aleurites family.

I claim:—

1. As a new composition of matter, a reaction product of tung oil and a dechlorinated oil.

2. As a new composition of matter, a solid reaction product of tung oil and a dechlorinated oil.

3. A paint or varnish film composition comprising tung oil and dechlorinated oil.

4. A paint or varnish composition comprising tung oil and dechlorinated oil, and a drier.

5. Process comprising reacting with tung oil upon a dechlorinated oil.

6. Process comprising reacting with tung oil upon a dechlorinated oil in presence of sulfur chlorid.

7. Process comprising reacting with tung oil upon a dechlorinated oil at a temperature not exceeding 200° C.

8. Process comprising mixing tung oil with dechlorinated oil, and heating the mixture to about 180° C.

9. Process comprising reacting with tung oil upon a dechlorinated oil in presence of a diluent.

10. Process comprising reacting with tung oil upon a dechlorinated oil in presence of a diluent volatile at the reacting temperature.

In testimony whereof, I affix my signature.

HENRY A. GARDNER.